(12) United States Patent
Suzuki et al.

(10) Patent No.: US 6,984,471 B2
(45) Date of Patent: Jan. 10, 2006

(54) NONAQUEOUS ELECTROLYTE AND NONAQUEOUS ELECTROLYTE BATTERY

(75) Inventors: Yusuke Suzuki, Kanagawa (JP); Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/194,722

(22) Filed: Jul. 12, 2002

(65) Prior Publication Data
US 2003/0087160 A1   May 8, 2003

(30) Foreign Application Priority Data
Jul. 19, 2001 (JP) ............................. 2001-220334

(51) Int. Cl.
*H01M 6/16* (2006.01)

(52) U.S. Cl. ............ 429/330; 429/327; 429/332; 429/331; 429/300; 429/303; 252/62.2

(58) Field of Classification Search ............ 429/327, 429/330, 332, 300, 303, 331; 252/62.2
See application file for complete search history.

(56) References Cited

U.S. PATENT DOCUMENTS

| | | | |
|---|---|---|---|
| 5,633,099 A | 5/1997 | Yokoyama et al. | |
| 5,830,600 A | 11/1998 | Narang et al. | |
| 5,910,381 A | 6/1999 | Barker et al. | |

FOREIGN PATENT DOCUMENTS

| | | |
|---|---|---|
| EP | 1 089 371 A1 | 4/2001 |

OTHER PUBLICATIONS

Nagasubramanian. "Fluoro-Carbonate Solvents For Li-ion Cells", Proceedings-Electrochemistry Society, 99-25, pp. 434-439, 2000.*

* cited by examiner

*Primary Examiner*—Laura Weiner
(74) *Attorney, Agent, or Firm*—Robert J. Depke; Trexler, Bushnell, Giangiorgi, Blackstone & Marr (57) ABSTRACT

A nonaqueous electrolyte has electrolyte salt dissolved in a nonaqueous solvent, wherein the ratio of the nonaqueous solvent having a ring structure is 50 wt % or more in all nonaqueous electrolyte solution components and the nonaqueous solvent includes at least one or more kinds of halogenated solvents expressed by a below-described general formula (1).

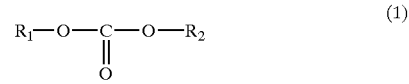

(Here, at least one of $R_1$ and $R_2$ designates an alkyl group having the number of carbons of 4 or larger and at least one of them is a halogenated alkyl group).

Thus, the decomposition of the halogenated solvent is suppressed.

12 Claims, 6 Drawing Sheets

NONAQUEOUS ELECTROLYTE AND NONAQUEOUS ELECTROLYTE BATTERY

This application claims priority to Japanese Patent Application Number JP2001-220334 filed Jul. 19, 2001 which is incorporated herein by reference.

BACKGROUND OF THE INVENTION

1. Field of the Invention

The present invention relates to a nonaqueous electrolyte which suppresses the decomposition of a solvent and a nonaqueous electrolyte battery whose cyclic characteristics are improved by employing such a nonaqueous electrolyte.

2. Description of the Related Art

In recent years, electronic devices such as portable telephones and notebook type personal computers have been progressively cordless and portable and thin, compact and light-weight portable electronic devices have been successively developed. In addition, a variety of electronic devices results in the increase of the consumed electric power. Accordingly, it has been increasingly demanded for batteries, especially, secondary batteries serving as the energy sources of these electronic devices to have high capacities.

As the secondary batteries which have been hitherto utilized, there are exemplified lead-acid batteries, nickel-cadmium batteries and nickel-metal hydride batteries. Further, as the secondary batteries having high capacities, lithium-ion batteries have been put to practical use. However, the conventional lithium-ion batteries can not undesirably sufficiently satisfy the demands of mobile devices or the like.

Further, as the portable devices come into wide use of common consumers, the devices have been frequently left under high temperature such as the inside of vehicles in the daytime. Thus, it has been demanded for the portable devices to give any danger to users in the above-described case as well as to be employed without any problems after that.

Now, the structure of the above-described lithium-ion secondary battery will be described below. On a cathode current collector made of a thin aluminum foil, a cathode active material composed of, for instance, $LiCoO_2$ and graphite is laminated. On an anode current collector made of a thin copper foil, an anode active material composed of carbon, coke, graphite, etc. is laminated. These members respectively form electrodes. A separator as a thin film made of polypropylene, polyethylene or the like and having pores is sandwiched in between the electrodes to obtain a battery body. The obtained battery body is sealed in a cylindrical or a prismatic battery can made of nickel plated iron, stainless steel, nickel plated stainless steel, aluminum or aluminum alloy, nickel, copper, titanium, etc. and used.

Further, a lithium polymer secondary battery has a sandwich structure that a part between the electrodes is filled with a gel electrolyte obtained by swelling polymers such as polyacrylonitrile (PAN), polyethylene oxide (PEO), polyvinylidene fluoride (PVDF) with electrolyte solution including lithium salts. Also in this case, a separator made of polyethylene or polypropylene may be employed. Such a unit cell having a sandwich structure is packaged by a sealing material composed of a metallic thin film such as an aluminum foil and a plastic film such as nylon, polyethylene, polypropylene, polyethylene terephthalate, etc, as a sealing container.

In order to obtain a battery having a high energy density and excellent in its large current discharging characteristics, low temperature characteristics and cyclic characteristics, a chemical and electrochemical stability and a high ionic conductivity are required for an electrolyte.

Since there is not a solvent which satisfies all demands and performances by itself in the lithium ion battery, a solvent obtained by mixing ethylene carbonate with chain carbonate as disclosed in Japanese Patent Application Laid-Open No. hei 4-162370 is employed. However, since the steam pressure of the chain carbonate is high, for instance, when an aluminum laminate film or the like is employed as an outer packaging material, the solvent of the battery swells under high temperature, which may be possibly generated when a mobile device using the battery containing the solvent is left in a vehicle in the daytime, so that the circuit of the mobile device is inconveniently overwhelmed. Further, the high steam pressure is considered to be a factor for lowering a reliability. For attempting to lower the steam pressure, there have been proposed a method for making an electrolyte gel (see Japanese Patent Application Laid-Open No. hei 5-109310 or the like) or a method for using a halogenated solvent (see Japanese Patent Application Laid-Open No. hei 11-102727 or the like).

However, although the electrolyte gelled, in case many low boiling point solvents were included, the steam pressure was not effectively lowered. Further, in the conventional halogenated solvent, as an electrochemical stability was lowered, there undesirably arose the deterioration of cyclic characteristics which might be generated as a result of a continuous decomposition of the halogenated solvent due to repeated charging and discharging operations.

SUMMARY OF THE INVENTION

The present invention is proposed by taking the above-described conventional problems into consideration and it is an object of the present invention to provide a nonaqueous electrolyte and a nonaqueous electrolyte battery having excellent characteristics while the decomposition of a halogenated solvent is suppressed.

A nonaqueous electrolyte according to the present invention has electrolyte salt dissolved in a nonaqueous solvent, wherein the ratio of the nonaqueous solvent having a ring structure is 50 wt % or more in nonaqueous solvent components and the nonaqueous solvent includes at least one or more kinds of halogenated solvents expressed by a below-described general formula (1).

(Here, at least one of $R_1$ and $R_2$ designates an alkyl group having the number of carbons of 4 or larger and at least one of them is a halogenated alkyl group).

In the nonaqueous electrolyte according to the present invention as described above, since the ratio of the nonaqueous solvent having the ring structure is 50 wt % or more, the nonaqueous electrolyte has a sufficient dielectric constant. Further, since the nonaqueous electrolyte includes one or more kinds of halogenated solvents expressed by the general formula (1), the decomposition of the nonaqueous electrolyte can be suppressed.

Further, a nonaqueous electrolyte battery according to the present invention comprises a cathode, an anode and a nonaqueous electrolyte, wherein the nonaqueous electrolyte has electrolyte salt dissolved in a nonaqueous solvent and the ratio of the nonaqueous solvent having a ring structure is 50 wt % or more in nonaqueous solvent components and the nonaqueous solvent includes at least one or more kinds of halogenated solvents expressed by a below-described general formula (1).

$$R_1-O-\underset{\underset{O}{\|}}{C}-O-R_2 \quad (1)$$

(Here, at least one of $R_1$ and $R_2$ designates an alkyl group having the number of carbons of 4 or larger and at least one of them is a halogenated alkyl group).

In the nonaqueous electrolyte battery according to the present invention as described above, since the ratio of the nonaqueous solvent having the ring structure is 50 wt % or more in the nonaqueous electrolyte, the nonaqueous electrolyte has a sufficient dielectric constant. Further, since the nonaqueous electrolyte includes one or more kinds of halogenated solvents expressed by the general formula (1), the decomposition of the nonaqueous electrolyte can be suppressed.

Furthermore, in the nonaqueous electrolyte battery according to the present invention using the above-described nonaqueous electrolyte, battery characteristics such as large current discharging characteristics or discharging characteristics under low temperature are effectively improved.

BRIEF DESCRIPTION OF THE DRAWINGS

The object and other objects and advantages of the present invention will be apparent more clearly from the following specification in conjunction with the accompanying drawings in which.

DETAILED DESCRIPTION OF THE PREFERRED EMBODIMENT

Now, a nonaqueous electrolyte battery to which the present invention is applied will be described below by referring to the accompanying drawings.

Figure 1:
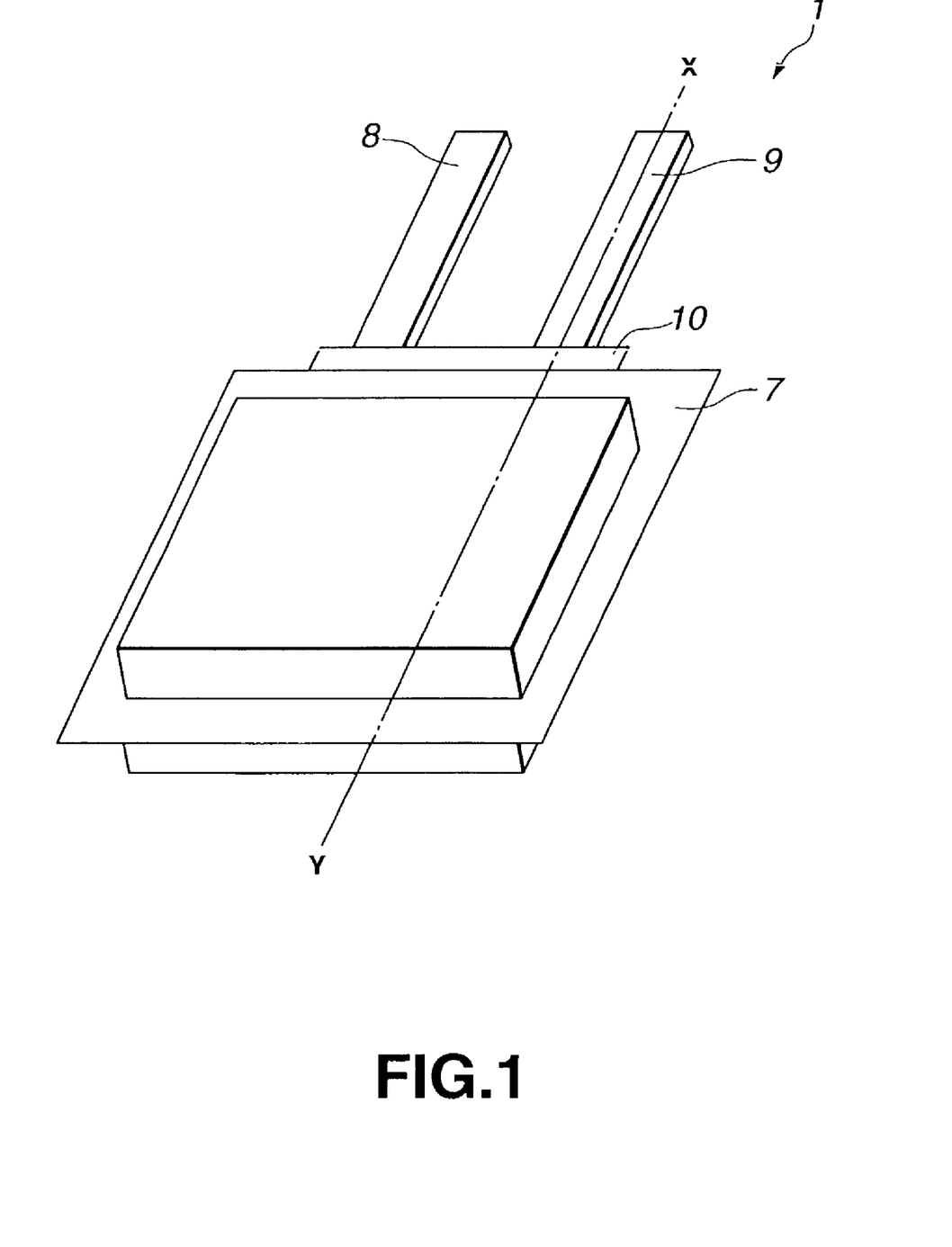
FIG. 1 is a perspective view showing one structural example of a gel electrolyte battery according to one embodiment of the present invention.
Figure 2:
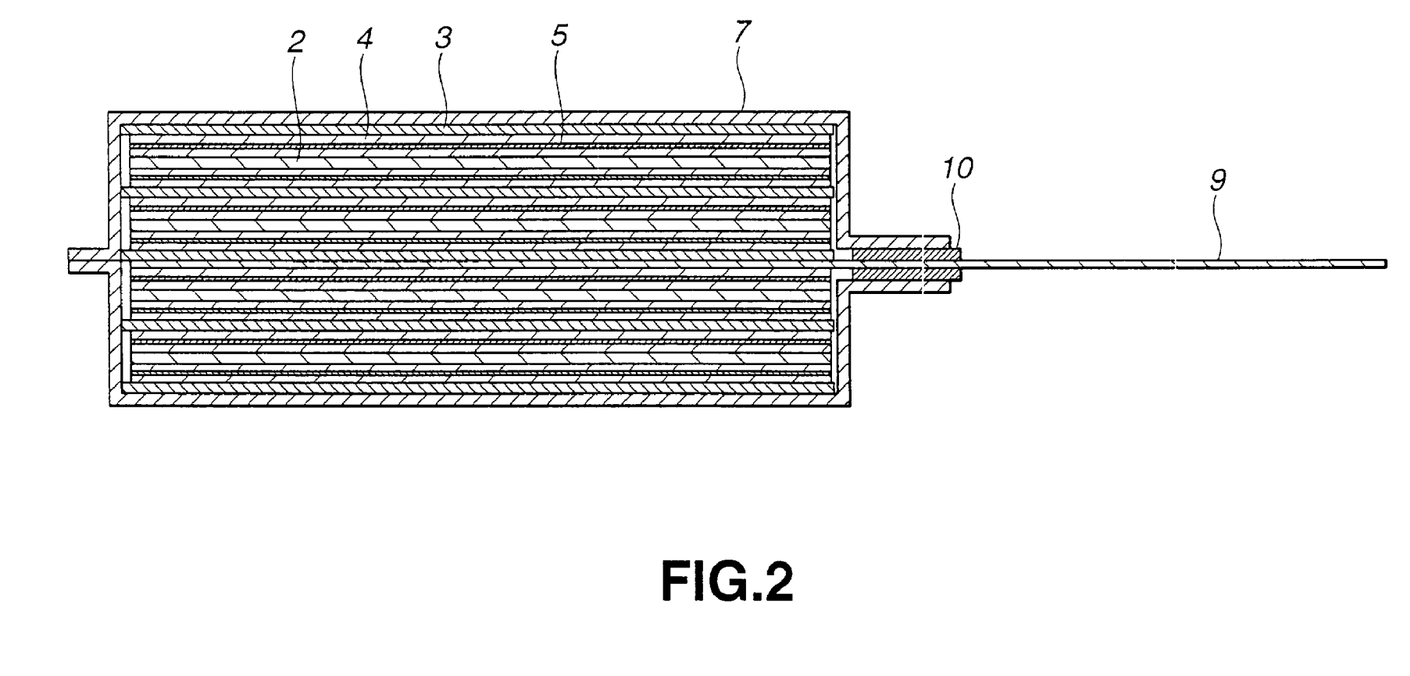
FIG. 2 is a sectional view taken along a line X-Y in FIG. 1.

One structural form of a gel electrolyte battery 1 is shown in FIGS. 1 and 2. The gel electrolyte battery 1 comprises an elongated cathode 2, an elongated anode 3 opposed to the cathode 2, gel electrolyte layers 4 formed on the cathode 2 and the anode 3, and a separator 5 disposed between the cathode 2 on which the gel electrolyte layer 4 is formed and the anode 3 on which the gel electrolyte layer 4 is formed.

Figure 3:
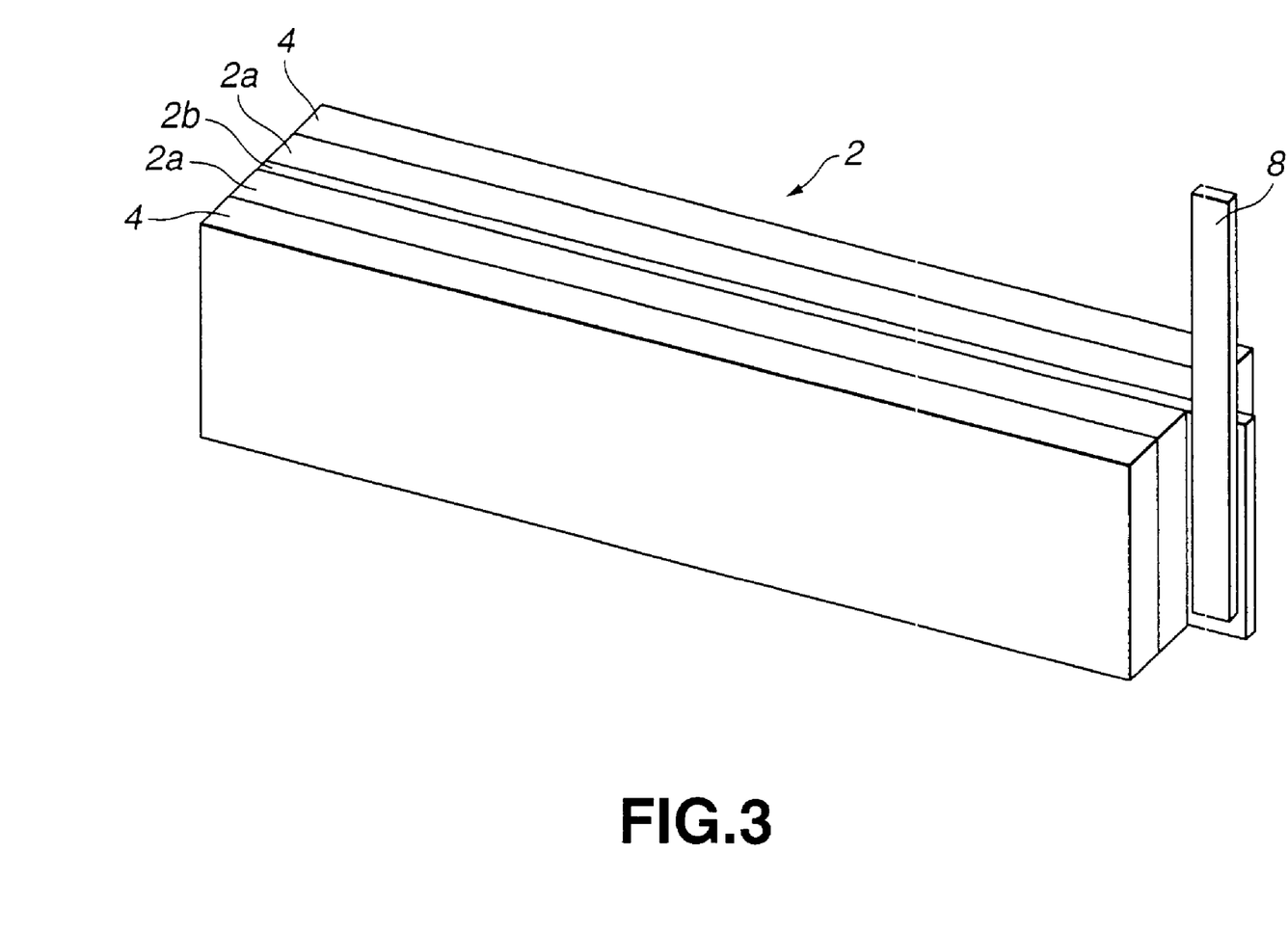
FIG. 3 is a perspective view showing one structural example of a cathode.

The cathode 2 has cathode active material layers 2a including cathode active materials formed on both the surfaces of a cathode current collector 2b as shown in FIG. 3. As the cathode current collector 2b, a metallic foil such as an aluminum foil is employed.

As the cathode active material, any material capable of being doped with or dedoped from lithium ions or anions may be employed without a specific limitation. The material desirably has the oxidation potential of 2.5 V or higher relative to lithium. Specifically, there may be employed, as the cathode active materials, lithium-containing transition metal oxides such as lithium cobaltate, lithium nickelate, lithium manganate, etc., lithium iron oxides or manganese phosphate having an olivine structure, transition metal chalcogens such as molybdenum sulfide, titanium sulfide, etc., hetero atom conjugated polymer compounds such as polyaniline, polypyrrole, etc., conjugated polymer compounds such as polydiacetylene, polyphenylene vinylene, etc. A method for manufacturing an electrode by using these active materials is not especially limited. For instance, as preferable methods for manufacturing the electrode, the active material may be formed in paste or the active material may be applied to a current collector such as an aluminum foil by employing a binding agent for a cathode composite mixture.

Further, as the binding agent of the cathode composite mixture, well-known binding agents ordinarily used for the cathode composite mixture of a battery may be employed. In addition, a well-known addition agent such as a conductive agent may be added to the cathode composite mixture.

Figure 4:
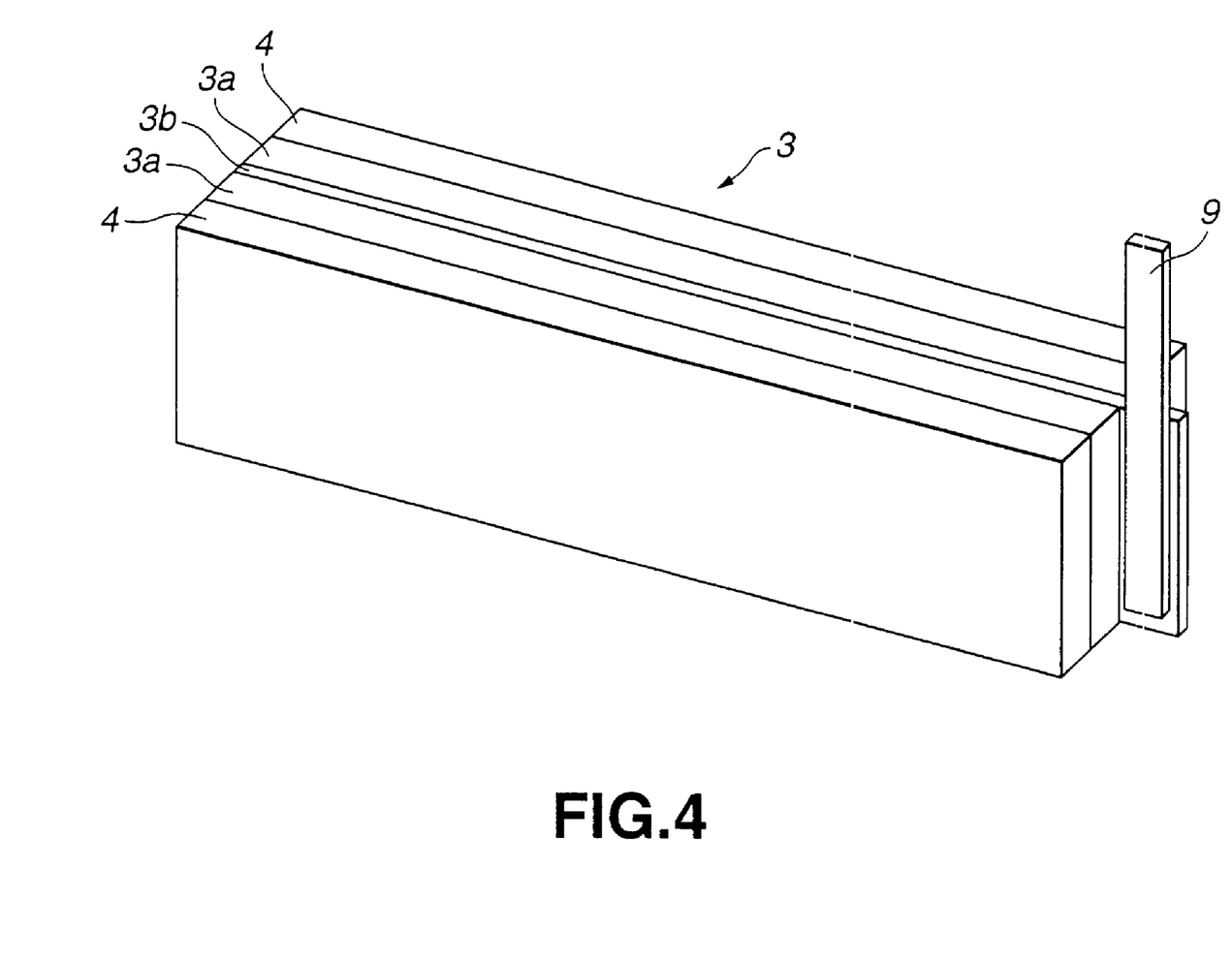
FIG. 4 is a perspective view showing one structural example of an anode.

As shown in FIG. 4, the anode 3 has anode active material layers 3a including anode active materials formed on both the surfaces of an anode current collector 3b. As the anode current collector 3b, for instance, a metallic foil such as a copper foil is employed.

As the anode active materials, there may be exemplified lithium compounds such as metallic lithium, lithium alloys, etc., carbon materials capable of being doped with lithium ions or transition metal compounds. The carbon materials or the transition metal compounds are not especially limited to specific materials and any of them capable of being doped with the lithium ions can be employed. As the carbon materials, there may be enumerated, for instance, PAN carbon materials, pitch carbon materials, vapor growth carbon materials, carbon fibers, natural graphite., etc. As the transition metal compounds, there may be employed chalcogenide compound, etc.

As a binding agent for an anode composite mixture, a well-known binding agent ordinarily employed for the anode composite mixture of a lithium-ion battery can be used. Further, a well-known addition agent or the like may be added to the anode composite mixture.

The gel electrolyte layer 4 comprises nonaqueous electrolyte solution having lithium salt dissolved in a nonaqueous solvent and a gel electrolyte including a matrix polymer for making the nonaqueous electrolyte solution gel.

The solvent components of the nonaqueous electrolyte solution employed in the present invention are not especially limited to specific materials and electrolyte solution including a conventional nonaqueous solvent and electrolyte is employed. There may be desirably used solvents which hardly generate a decomposition reaction within a range of the operation potential of the lithium-ion secondary battery. There may be used, for instance, cyclic carbonates such as propylene carbonate, ethylene carbonate, vinylene carbonate, etc., cyclic esters such as γ-butyrolactone, etc., chain carbonates such as dimethyl carbonate, ethyl methyl carbonate, etc., chain ethers such as dimethoxyethane, etc., chain esters such as methyl propionate, etc., and dimethyl sulfoxide, acetonitrile or derivatives thereof.

In the gel electrolyte battery according to the present invention, the nonaqueous electrolyte solution includes the nonaqueous solvent having a ring structure such as ethylene carbonate, propylene carbonate, γ-butyrolactone or the derivatives of them and the nonaqueous solvent occupies 50 wt % or more in all nonaqueous solvent components and includes at least one or more kinds of halogenated carbonates expressed by a general formula (1)

(Here, at least one of $R_1$ and $R_2$ designates an alkyl group having the number of carbons of 4 or larger and at least one of them is a halogenated alkyl group).

Since the nonaqueous solvents having the ring structures represented by ethylene carbonate, propylene carbonate, γ-butyrolactone or the derivatives of them have a high boiling point, the nonaqueous solvents do not generate such a problem as swelling. Further, the nonaqueous solvents having the ring structures have been known as excellent nonaqueous solvents with high dielectric constants. When the ratio of the nonaqueous solvent having the above described ring structure is lower than 50 wt % in the nonaqueous solvent components, the dielectric constant of all the nonaqueous electrolyte solution cannot be enhanced. Accordingly, the ratio of the nonaqueous solvent having the ring structure is 50 wt % or higher in the nonaqueous solvent components, so that the nonaqueous electrolyte solution can have a sufficient dielectric constant. However, since these nonaqueous solvents having the ring structures are high in their melting point or viscosity, desired large current discharging characteristics or discharging characteristics under low temperature cannot be obtained.

Thus, according to the present invention, the halogenated carbonate expressed by the general formula (1) is included in the electrolyte solution. The decomposition of the halogenated carbonate expressed by the general formula (1) is suppressed even under repeated charging and discharging operations. Therefore, the halogenated carbonate expressed by the general formula (1) is included in the electrolyte solution, so that battery characteristics such as the large current discharging characteristics or the discharging characteristics under the low temperature can be improved without generating such problems such as the swelling of the battery or the deterioration of cyclic characteristics.

Although the number of carbons of at least one of $R_1$ and $R_2$ is not smaller than 4 in the halogenated carbonate expressed by the general formula (1), when the halogenated carbonate is a large molecule that the number of carbons of either $R_1$ or $R_2$ exceeds 10 or the total of the number of carbons of $R_1$ and $R_2$ exceeds 14, the viscosity of the electrolyte solution is inconveniently increased, and accordingly, the improvement of the large current discharging characteristics or the low temperature characteristics is hardly effectively achieved. Therefore, the number of carbons of $R_1$ or $R_2$ is preferably 10 or smaller and the total of the number of carbons of $R_1$ and $R_2$ is 14 or smaller in the above described general formula (1).

Such halogenated carbonates, there are specifically enumerated n-butyl-2,2,2-trifluoroethylcarbonate (FEBC) expressed by a chemical formula (2), n-butyl-3,3,3-trifluoropropylcarbonate (FPBC) expressed by a chemical formula (3), halogenated carbonates in which both the ends of a molecular chain are halogenated (fluorinated in the above-described examples), halogenated carbonates in which the number of carbons of both alkyl groups is 4 or larger, alkyl chains branch, etc., as shown by other chemical formulae (4) to (7).

The ratio of the halogenated carbonate is preferably located within a range of 10 wt % or more and 20 wt % or less in the nonaqueous solvent components. When the ratio of the halogenated carbonate is lower than 10 wt % in the nonaqueous solvent components, the battery characteristics of the present invention such as the large current discharging characteristics or the discharging characteristics under the low temperature cannot be effectively and sufficiently obtained. On the other hand, when the ratio of the halogenated carbonate exceeds 20 wt % in the nonaqueous solvent components, since the dielectric constant of the halogenated carbonate is low, the dielectric constant of the electrolyte solution is inconveniently lowered. Therefore, the ratio of the halogenated carbonate is located within a range of 10 wt % or more and 20 wt % or less in the nonaqueous solvent components, so that the battery characteristics of the gel electrolyte battery 1 such as the large current discharging characteristics or the discharging characteristics under the low temperature.

As the lithium salt dissolved in the above-described nonaqueous solvents, there are exemplified, for instance, $LiPF_6$, $LiBF_4$, $LiAsF_6$, $LiCF_3SO_3$, $LiN(CF_3SO_2)_2$, $LiC(CF_3SO_2)_3$, $LiClO_4$, $LiF$, $LiBr$, etc. $LiPF_6$ is most preferably employed among them from the viewpoint of charging and discharging characteristics. However, the lithium salt is not necessarily limited to them.

A matrix polymer for making the nonaqueous electrolyte solution as mentioned above gel may be employed without especially limiting it to a specific material. There are specifically exemplified, for instance, polyethers such as polyethylene oxide, polypropylene oxide, etc., halogen-containing polymer compounds such as polytetrafluoro ethylene, polyvinylidene fluoride, polyvinylidene chloride, etc., polymer compounds including as a main component any of methacrylic acid or various esters thereof, polyacrylamide, polycarbonate, polysulfone and polyether sulfone, or derivatives, copolymers and mixtures thereof, etc.

The gel electrolyte layers 4 are formed in such a manner that solution obtained by mixing the above-described nonaqueous electrolyte solution, the matrix polymer and the addition agent together is applied to the cathode active material layers 2a and the anode active material layers 3a, the cathode active material layers 2a and the anode active material layers 3a are impregnated with the solution and the solution is solidified by removing the solvent. The gel electrolyte layers 4 having a part with which the cathode active material layers 2a and the anode active material layers 3a are impregnated are laminated on the cathode active material layers 2a and the anode active material layers 3a.

Figure 5:
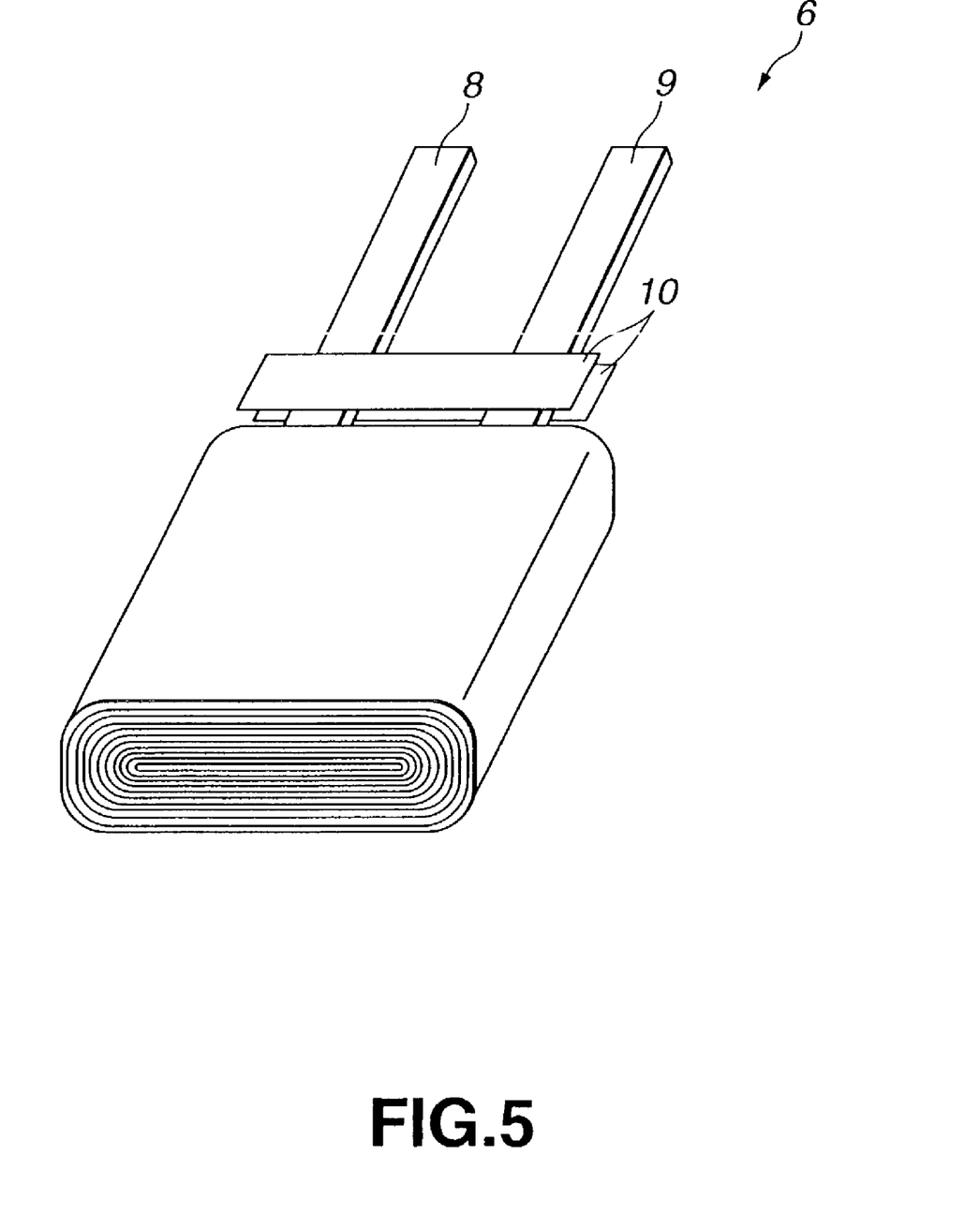
FIG. 5 is a perspective view showing a state in which the cathode and the anode are formed a spirally coiled electrode body.

Then, the gel electrolyte battery 1 is formed by laminating the cathode 2 on which the gel electrolyte layers 4 are formed and the anode 3 on which the gel electrolyte layers 4 are formed through the separator 5, longitudinally coiling the laminated body to have a spirally coiled electrode body 6 as shown in FIG. 5 and covering and sealing the spirally coiled electrode body 6 with an outer packaging film 7 made of an insulating material. A cathode terminal 8 is connected to the cathode 2 and an anode terminal 9 is connected to the anode 3, respectively. The cathode terminal 8 and the anode terminal 9 are held between sealing parts as the peripheral edge parts of the outer packaging film 7. Resin films 10 are provided in the parts with which the cathode terminal 8 and the anode terminal 9 come into contact.

In the above-described gel electrolyte battery 1, since the nonaqueous solvent in the nonaqueous electrolyte solution forming the gel electrolyte such as ethylene carbonate, propylene carbonate, γ-butyrolactone or the derivatives of them occupies 50 wt % or more in all the nonaqueous solvent components, a dielectric constant sufficient for the gel electrolyte can be realized. Further, since the gel electrolyte battery includes at least one or more kinds of halogenated carbonates expressed by the above-described general formula (1) in the nonaqueous electrolyte solution, the battery characteristics of the gel electrolyte battery such as the large current discharging characteristics or the discharging characteristics under the low temperature are improved. In the gel electrolyte battery, since the halogenated carbonate the decomposition of which is suppressed even under repeated charging and discharging operations is employed, there are not generated problems such as the swelling of the battery or the deterioration of cyclic characteristics. More specifically, the gel electrolyte battery can be realized in which the rate of change of thickness after the battery is stored at 100° C. for 3 hours under a charged state is suppressed to a value lower than 20%.

In the above-described embodiment, although the gel electrolyte battery in which the gel electrolyte obtained by making the nonaqueous electrolyte solution gel by the matrix polymer is employed as the nonaqueous electrolyte is described as an example, it is to be understood that the present invention is not limited thereto, and the present invention may be applied to a nonaqueous electrolyte battery using nonaqueous electrolyte solution which is not made to gel.

Further, in the above-described embodiment, although the elongated cathode 2 and the elongated anode 3 are laminated and the laminated body is longitudinally coiled to have the spirally coiled electrode body 6, it is to be understood that the present invention is not limited thereto and a rectangular cathode 2 and a rectangular anode 3 may be laminated to have a laminated electrode body or a laminated electrode body may be alternately folded. The gel electrolyte battery 1 according to the present embodiment as mentioned above is not especially limited to a specific configuration and may have various kinds of size such as a thin or a large form. Furthermore, the present invention may be applied to a primary battery and a secondary battery.

EXAMPLES

Now, Examples carried out to recognize the effects of the present invention will be described below. In the following explanation, although specific numeric values are described as examples, it is to be understood that the present invention is not limited thereto.

Firstly, in Samples 1 to 24, a gel electrolyte battery was manufactured to evaluate the characteristics thereof.

Sample 1

Initially, an anode was manufactured as described below. Pulverized graphite powder of 90 parts by weight as an anode active material was mixed with polyvinylidene fluoride-co-hexafluoro propylene of 10 parts by weight as a binding agent to prepare an anode composite mixture. The anode composite mixture was dispersed in N-methyl-2-pyrrolidone to have slurry. The slurry was uniformly applied to both the surfaces of an elongated copper foil having the thickness of 10 $\mu$m and dried and the copper foil having the slurry dried was compression-molded by a roll press machine to manufacture the anode.

Further, a cathode was manufactured as described below. Initially, lithium carbonate and cobalt carbonate were mixed together in the ratio 0.5 mol to 1 mol in order to obtain a cathode active material ($LiCoO_2$) and the obtained mixture was sintered in air at 900° C. for 5 hours. Then, the obtained $LiCoO_2$ of 91 parts by weight, graphite of 6 parts by weight as a conductive agent and polyvinylidene fluoride-co-hexafluoro propylene of 10 parts by weight as a binding agent were mixed together to prepare a cathode composite mixture. The cathode composite mixture was dispersed in N-methyl-2-pyrrolidone to have slurry. Then, the slurry was uniformly applied to both the surfaces of an elongated aluminum foil having the thickness of 20 $\mu$m and dried, and then, the aluminum foil with the slurry dried was compression-molded by a roll press machine to manufacture the cathode. The area density of the active material per unit area of the cathode was 40 mg/cm$^2$.

Then, a gel electrolyte was manufactured. Firstly, ethylene carbonate (EC) of 15 wt %, propylene carbonate (PC) of 15 wt % and diethyl carbonate (DEC) of 70 wt % were mixed together to obtain a nonaqueous solvent. $LiPF_6$ of 15 parts by weight as electrolyte salt was dissolved in the nonaqueous solvent of 85 parts by weight to prepare nonaqueous electrolyte solution. Then, the nonaqueous electrolyte solution of 90 parts by weight was homogeneously mixed and dissolved with polyvinylidene fluoride-co-hexafluoro propylene of 10 parts by weight as a matrix polymer to prepare the gel electrolyte solution.

After that, the obtained gel electrolyte solution was uniformly applied to the cathode and the anode. The cathode and the anode were stuck to each other to obtain a battery element. The obtained battery element has a sandwich structure comprising the cathode, the gel electrolyte and the anode. The outside dimension of the battery element was 5 cm×4 cm×0.4 cm. The battery element was packed under vacuum by a laminate film having a three-layer structure composed of polypropylene, aluminum and nylon to obtain the gel electrolyte battery.

Sample 2 to Sample 24

A gel electrolyte battery was manufactured in the same manner as that of the Sample 1 except that the composition of a nonaqueous solvent was changed as shown in Table 1 when electrolyte solution was prepared.

In the Table 1, FEBC designates n-butyl-2,2,2-trifluoroethylcarbonate and FPBC designates n-butyl-3,3,3-trifluoropropyl carbonate.

The large current discharging characteristics, the low temperature characteristics, the cyclic characteristics and the high temperature storage characteristics of the gel electrolyte batteries of the Samples 1 to 24 manufactured as described above were evaluated.

Cyclic Characteristics

Charging and discharging cyclic tests were carried out 500 times under a 2 hour rate discharge of a theoretical capacity (½ C) to evaluate results as described below. Firstly, a constant-current and constant-voltage charging operation was carried out to each battery at 23° C. up to the upper limit of 4.2 V, and then, a constant-current discharging operation of (½ C) was carried out up to the final voltage of 3.2 V. A discharging capacity was determined in such a manner. Further, an output under the hour rate discharge was calculated as a percentage relative to ⅕ C in the beginning of the cycles (a first cycle) on the basis of average voltage obtained therefrom.

Large Current Discharging Characteristics

A ⅓ hour rate discharge (3 C) of the theoretical capacity was carried out to evaluate obtained results as described below. Firstly, a constant-current and constant-voltage charging operation was carried out to each battery for 10 hours at 23° C. up to the upper limit of 4.2 V, and then, a constant current discharging operation of 3 C was carried out up to the final voltage of 3.2 V. A discharging capacity was determined in such a manner. Further, an output under the ⅓ hour rate discharge was calculated as a percentage relative to ⅕ C on the basis of average voltage obtained therefrom.

Low Temperature Discharging Characteristics

A 2 hour rate discharge (0.5 C) at low temperature (−20° C.) of the theoretical capacity was carried out to evaluate obtained results as described below. Firstly, a constant-current and constant-voltage charging operation was carried out for 10 hours to each battery at 23° C. up to the upper limit of 4.2 V, then, the battery was left for 1 hour in a constant temperature bath whose temperature was maintained at −20° C. and then, the 2 hour rate discharge was carried out up to the final voltage of 3.2 V. A discharging capacity was determined in such a manner. Further, an output under the 2 hour rate discharge at −20° C. was calculated as a percentage relative to the 2 hour rate discharge at 23° C. on the basis of average voltage obtained therefrom.

High Temperature Storage Test

A storage test under high temperature was carried out to each gel electrolyte battery as described below.

Firstly, after the battery was charged to 4.25V, its thickness was measured. Then, the battery was left in a constant temperature bath whose temperature was maintained at 100° C.±2° C. for 3 hours. After 3 hours, the battery was taken out from the constant temperature bath to immediately measure the thickness and measure the rate of change of thickness (%) before and after the battery was stored at the high temperature.

The evaluated results of the battery characteristics in the gel electrolyte batteries of the Samples 1 to 24 are shown in the Table 1 as well as the compositions of the solvents of the electrolyte solution.

TABLE 1

| | Composition of Nonaqueous Solvent (wt %) | | | | |
|---|---|---|---|---|---|
| | EC | PC | DEC | FEBC | FPBC |
| Sample 1 | 15 | 15 | 70 | 0 | 0 |
| Sample 2 | 15 | 15 | 60 | 10 | 0 |
| Sample 3 | 15 | 15 | 50 | 20 | 0 |
| Sample 4 | 15 | 15 | 50 | 0 | 20 |
| Sample 5 | 15 | 15 | 50 | 10 | 10 |
| Sample 6 | 15 | 15 | 10 | 40 | 20 |
| Sample 7 | 20 | 20 | 60 | 0 | 0 |
| Sample 8 | 20 | 20 | 50 | 10 | 0 |
| Sample 9 | 20 | 20 | 50 | 0 | 10 |
| Sample 10 | 20 | 20 | 40 | 10 | 10 |
| Sample 11 | 25 | 25 | 50 | 0 | 0 |
| Sample 12 | 25 | 25 | 40 | 10 | 0 |
| Sample 13 | 25 | 25 | 40 | 0 | 10 |
| Sample 14 | 25 | 25 | 30 | 10 | 10 |
| Sample 15 | 25 | 25 | 20 | 30 | 0 |
| Sample 16 | 25 | 25 | 10 | 40 | 0 |
| Sample 17 | 40 | 40 | 20 | 0 | 0 |
| Sample 18 | 40 | 40 | 10 | 10 | 0 |
| Sample 19 | 40 | 40 | 10 | 0 | 10 |
| Sample 20 | 40 | 40 | 0 | 10 | 10 |
| Sample 21 | 45 | 45 | 0 | 10 | 0 |
| Sample 22 | 47.5 | 47.5 | 0 | 5 | 0 |
| Sample 23 | 49 | 49 | 0 | 2 | 0 |
| Sample 24 | 50 | 50 | 0 | 0 | 0 |

| | Load Characteristics (%) | Low Temperature Characteristics (%) | Cyclic Characteristics (%) | Rate of Change of Thickness (%) |
|---|---|---|---|---|
| Sample 1 | 47 | 25 | 74 | 102 |
| Sample 2 | 46 | 25 | 76 | 88 |
| Sample 3 | 48 | 27 | 76 | 49 |
| Sample 4 | 46 | 26 | 75 | 43 |
| Sample 5 | 46 | 26 | 76 | 50 |
| Sample 6 | 50 | 24 | 72 | 15 |
| Sample 7 | 50 | 28 | 76 | 62 |
| Sample 8 | 52 | 27 | 75 | 28 |
| Sample 9 | 51 | 26 | 74 | 26 |
| Sample 10 | 52 | 27 | 75 | 20 |
| Sample 11 | 59 | 27 | 75 | 16 |
| Sample 12 | 66 | 32 | 74 | 12 |
| Sample 13 | 68 | 32 | 76 | 13 |
| Sample 14 | 70 | 33 | 76 | 8 |
| Sample 15 | 68 | 33 | 74 | 16 |
| Sample 16 | 52 | 25 | 74 | 6 |
| Sample 17 | 75 | 32 | 76 | 5 |
| Sample 18 | 81 | 37 | 75 | 5 |
| Sample 19 | 82 | 36 | 76 | 4 |
| Sample 20 | 86 | 41 | 75 | 4 |
| Sample 21 | 88 | 38 | 76 | 4 |
| Sample 22 | 80 | 22 | 75 | 4 |
| Sample 23 | 80 | 20 | 75 | 4 |
| Sample 24 | 80 | 20 | 75 | 4 |

The ratio of the nonaqueous solvent having the ring structure is increased so that the nonaqueous electrolyte solution may have a sufficient dielectric constant. In order to give the sufficient dielectric constant to the nonaqueous electrolyte solution, the ratio of the nonaqueous solvent having the ring structure is preferably 50 wt % or more. However, when the ratio of the nonaqueous solvent having the ring structure is increased, the large current discharging characteristics or the low temperature characteristics become undesirable. Further, while chain carbonate such as DEC is useful for improving the cyclic characteristics, it is liable to be decomposed. Accordingly, the battery inconveniently swells due to the generation of gas.

As apparent from the Table 1, when the Sample 2 to the Sample 6 respectively having the same ratio of the nonaqueous solvent with the ring structure and including the halogenated carbonate in the nonaqueous solvent are compared with the Sample 1 including no halogenated carbonate in the nonaqueous solvent, and similarly when the Sample 8 to Sample 10 are compared with the Sample 7, the Sample 12 to the Sample 16 are compared with the Sample 11, and the Sample 18 to Sample 20 are compared with the Sample 17, respectively, the large current discharging characteristics or the low temperature characteristics in the Samples including the halogenated carbonate are improved more than those of the Samples including no halogenated carbonate. Further, as apparently recognized from the Table 1, the decomposition of the solvent and the swelling of the battery in the Samples including the halogenated carbonate are obviously suppressed more than those of the Samples including no halogenated carbonate.

Further, in the conventional battery using a halogenated solvent, although the cyclic characteristics have been disadvantageously deteriorated, which is considered to be generated as a result of the continuous decomposition of the halogenated solvent, according to the present invention, the halogenated carbonate expressed by the general formula (1) is employed so that the decomposition of the halogenated sovent is suppressed. As compared with the Samples including no halogenated carbonate, it is recognized that the cyclic characteristics are not deteriorated in the present invention.

As apparently understood from the above-described results, since the halogenated carbonate is included in the electrolyte solution, even when the ratio of the nonaqueous solvent having the ring structure is increased, the battery characteristics such as the large current discharging characteristics or the discharging characteristics under low temperature can be improved without generating problems such as the swelling of the battery or the deterioration of the cyclic characteristics. When the ratio of the nonaqueous solvent having the ring structure is 50 wt % or more, the effects of the present invention including the large current discharging characteristics or the low temperature characteristics may obviously appear by including the halogenated carbonate in the electrolyte solution.

Further, as apparent from the Table 1, the battery characteristics such as the large current discharging characteristics or the low temperature characteristics cannot be effectively and sufficiently obtained in the Sample 23 in which the ratio of the halogenated carbonate is 2 wt % in nonaqueous solvent components or the Sample 22 in which the ratio of the halogenated carbonate is 5 wt %. Further, in the Sample 6 in which the ratio of the halogenated carbonate is 60 wt % in the nonaqueous solvent components, the Sample 15 in which the ratio of the halogenated carbonate is 30 wt %, and the Sample 16 in which the ratio of the halogenated carbonate is 40 wt %, since the dielectric constants of the halogenated carbonates are low, the dielectric constant of the electrolyte solution is inconveniently lowered.

Accordingly, it is understood that the ratio of the halogenated carbonate is located within a range of 10 wt % or more and 20 wt % or less in the nonaqueous solvent components, so that the battery characteristics of the gel electrolyte battery 1 such as the large current discharging characteristics or the discharging characteristics under the low temperature can be improved without lowering the dielectric constant of the electrolyte solution.

Subsequently, in Samples 25 to 49, cylindrical nonaqueous electrolyte batteries were manufactured to evaluate the characteristics of them.

Sample 25

Firstly, a cathode and an anode were manufactured in the same manner as that of the Sample 1.

Then, ethylene carbonate (EC) of 15 wt %, propylene carbonate (PC) of 15 wt % and diethyl carbonate (DEC) of 70 wt % were mixed together to obtain a nonaqueous solvent. $LiPF_6$ of 15 parts by weight as electrolyte salt was dissolved in the nonaqueous solvent of 85 parts by weight to prepare nonaqueous electrolyte solution.

Figure 6:
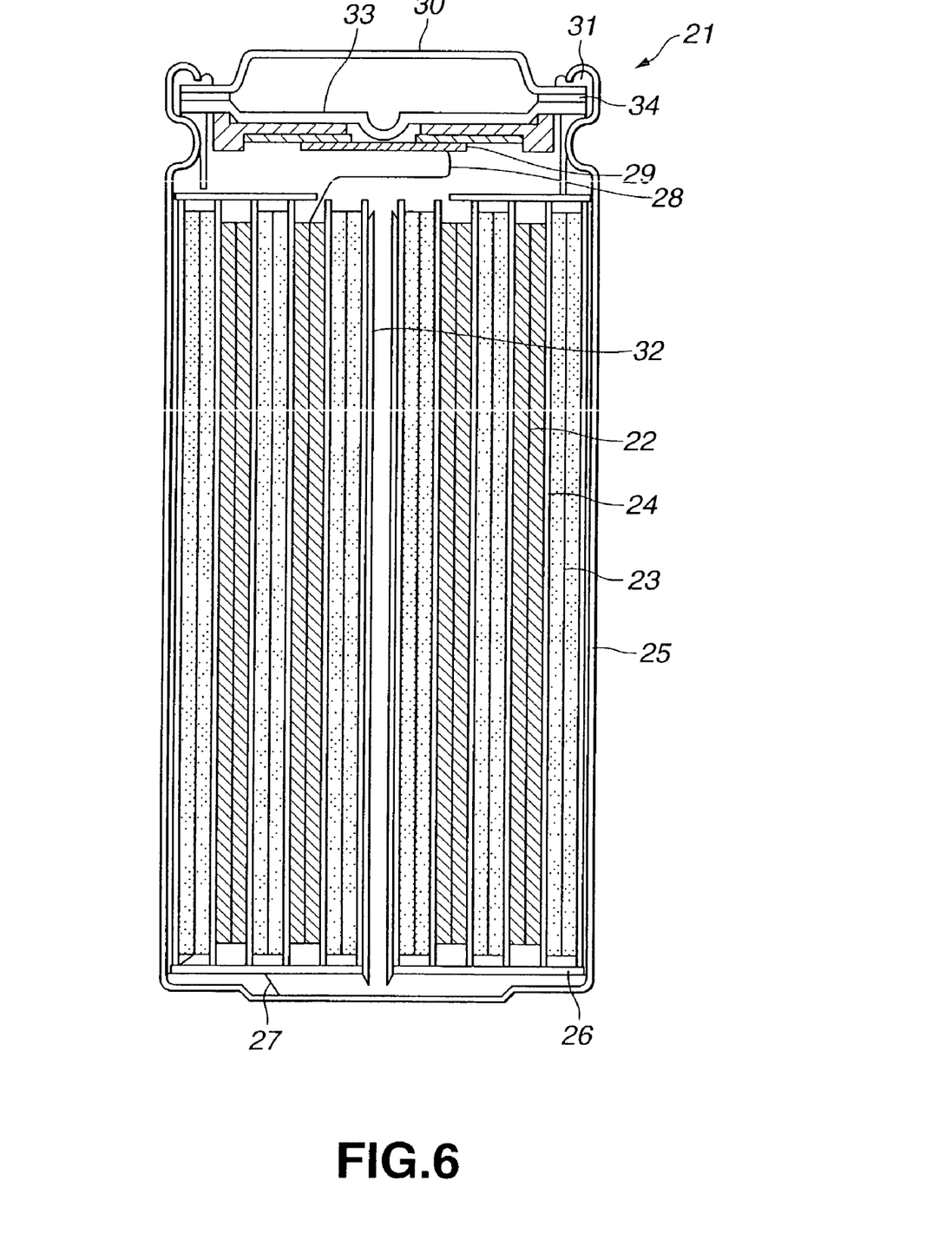
FIG. 6 is a longitudinally sectional view showing one structural example of a nonaqueous electrolyte battery manufactured in an Example.

The cathode 22 and the anode 23 manufactured as mentioned above were made to come into contact with each other through a separator 24 made of a microporous polyethylene film and the obtained body was coiled many times to form a spirally coiled electrode body as shown in FIG. 6.

Then, an insulating plate 26 was inserted on the bottom part of an iron battery can 25 the inner part of which was plated with nickel and the coiled electrode body was accommodated therein. In order to collect the electric current of the anode, one end of an anode lead 27 made of, for instance, nickel was stuck to the anode 23 and the other end was welded to the battery can 25. Further, in order to collect the electric current of the cathode 22, one end of a cathode lead 28 made of, for instance, aluminum was stuck to the cathode 22 and the other end was electrically connected to a battery cover 30 through a current cutting off plate 29.

Then, nonaqueous electrolyte solution was injected to the battery can 25. After that, the battery cover 30 was caulked through an insulating sealing gasket 31 to which asphalt was applied to fix the battery cover 30 to the battery can 25 and obtain the cylindrical nonaqueous electrolyte battery 21. In the nonaqueous electrolyte battery 21, a center pin 32 connected to the anode lead 27 and the cathode lead 28 is provided as shown in FIG. 6. Further, there are provided in the nonaqueous electrolyte battery 21 a safety valve device 33 for purging gas in the battery when pressure in the battery is higher than a prescribed value and a PTC (Positive Temperature Coefficient) element 34 for preventing the rise of temperature in the battery.

Samples 26 to 49

Cylindrical nonaqueous electrolyte batteries were manufactured in the same manner as that of the Sample 25 except that the compositions of nonaqueous solvents were changed as shown in Table 2 when nonaqueous electrolyte solution was prepared.

In the Table 2, FEBC designates n-butyl-2,2,2-trifluoroethylcarbonate and FPBC designates n-butyl-3,3,3-trifluoropropyl carbonate.

Then, various kinds of experiments were carried out to the cylindrical nonaqueous electrolyte batteries manufactured as mentioned above to evaluate the characteristics of them.

The large current discharging characteristics, the low temperature characteristics, and the cyclic characteristics in the cylindrical nonaqueous electrolyte batteries of the Samples 25 to 49 manufactured as described above were evaluated. The evaluation was made in the same manner as that in the above-described Samples 1 to 24.

The evaluated results of the battery characteristics in the cylindrical nonaqueous electrolyte batteries of the Samples 25 to 49 are shown in the Table 2 as well as the compositions of the solvents of electrolyte solution.

TABLE 2

| | Composition of Nonaqueous Solvent (wt %) | | | | |
|---|---|---|---|---|---|
| | EC | PC | DEC | FEBC | FPBC |
| Sample 25 | 15 | 15 | 70 | 0 | 0 |
| Sample 26 | 15 | 15 | 60 | 10 | 0 |
| Sample 27 | 15 | 15 | 50 | 20 | 0 |
| Sample 28 | 15 | 15 | 50 | 0 | 20 |
| Sample 29 | 15 | 15 | 50 | 10 | 10 |
| Sample 30 | 15 | 15 | 30 | 20 | 20 |
| Sample 31 | 15 | 15 | 10 | 40 | 20 |
| Sample 32 | 20 | 20 | 60 | 0 | 0 |
| Sample 33 | 20 | 20 | 50 | 10 | 0 |
| Sample 34 | 20 | 20 | 50 | 0 | 10 |
| Sample 35 | 20 | 20 | 40 | 10 | 10 |
| Sample 36 | 25 | 25 | 50 | 0 | 0 |
| Sample 37 | 25 | 25 | 40 | 10 | 0 |
| Sample 38 | 25 | 25 | 40 | 0 | 10 |
| Sample 39 | 25 | 25 | 30 | 10 | 10 |
| Sample 40 | 25 | 25 | 20 | 30 | 0 |
| Sample 41 | 25 | 25 | 10 | 40 | 0 |
| Sample 42 | 40 | 40 | 20 | 0 | 0 |
| Sample 43 | 40 | 40 | 10 | 10 | 0 |
| Sample 44 | 40 | 40 | 10 | 0 | 10 |
| Sample 45 | 40 | 40 | 0 | 10 | 10 |
| Sample 46 | 45 | 45 | 0 | 10 | 0 |
| Sample 47 | 47.5 | 47.5 | 0 | 5 | 0 |
| Sample 48 | 49 | 49 | 0 | 2 | 0 |
| Sample 49 | 50 | 50 | 0 | 0 | 0 |

| | Load Characteristics (%) | Low Temperature Characteristics (%) | Cyclic Characteristics (%) |
|---|---|---|---|
| Sample 25 | 86 | 43 | 71 |
| Sample 26 | 84 | 42 | 71 |
| Sample 27 | 80 | 39 | 71 |
| Sample 28 | 81 | 37 | 72 |
| Sample 29 | 80 | 39 | 71 |
| Sample 30 | 68 | 31 | 70 |
| Sample 31 | 77 | 32 | 71 |
| Sample 32 | 82 | 38 | 70 |
| Sample 33 | 81 | 37 | 71 |
| Sample 34 | 81 | 38 | 71 |
| Sample 35 | 79 | 36 | 72 |
| Sample 36 | 79 | 31 | 72 |
| Sample 37 | 81 | 33 | 72 |
| Sample 38 | 81 | 34 | 72 |
| Sample 39 | 82 | 36 | 70 |
| Sample 40 | 78 | 32 | 70 |
| Sample 41 | 75 | 38 | 71 |
| Sample 42 | 70 | 20 | 70 |
| Sample 43 | 76 | 28 | 71 |
| Sample 44 | 74 | 26 | 71 |
| Sample 45 | 74 | 31 | 71 |
| Sample 46 | 64 | 22 | 72 |
| Sample 47 | 60 | 13 | 72 |
| Sample 48 | 56 | 10 | 71 |
| Sample 49 | 56 | 10 | 70 |

As apparent from the Table 2 as well as from the Table 1, when the Sample 26 to the Sample 31 respectively having the same ratio of the nonaqueous solvent with the ring structure and including the halogenated carbonate in the nonaqueous solvent are compared with the Sample 25 including no halogenated carbonate in the nonaqueous solvent, and similarly when the Sample 33 to Sample 35 are compared with the Sample 32, the Sample 37 to the Sample 41 are compared with the Sample 36, and the Sample 43 to Sample 45 are compared with the Sample 42, respectively, the large current discharging characteristics or the low temperature characteristics in the Samples including the halogenated carbonate are improved more than those of the Samples including no halogenated carbonate.

Further, in the conventional battery using a halogenated solvent, although the cyclic characteristics have been disadvantageously deteriorated, which is considered to be generated as a result of the continuous decomposition of the halogenated solvent, according to the present invention, the halogenated carbonate expressed by the general formula (1) is employed so that the decomposition of the halogenated solvent is suppressed. As compared with the Samples including no halogenated carbonate in the nonaqueous solvent, it is recognized that the cyclic characteristics are not deteriorated in the present invention.

As apparently understood from the above-described results, since the halogenated carbonate is included in the electrolyte solution, even when the ratio of the nonaqueous solvent having the ring structure is increased, the battery characteristics such as the large current discharging characteristics or the discharging characteristics under low temperature can be improved without generating problems such as the swelling of the battery or the deterioration of the cyclic characteristics. When the ratio of the nonaqueous solvent having the ring structure is 50 wt % or more, the effects of the present invention including the large current discharging characteristics or the low temperature characteristics may obviously appear by including the halogenated carbonate in the electrolyte solution.

Further, as apparent from the Table 2, the battery characteristics such as the large current discharging characteristics or the low temperature characteristics cannot be effectively and sufficiently obtained in the Sample 48 in which the ratio of the halogenated carbonate is 2 wt % in nonaqueous solvent components or the Sample 47 in which the ratio of the halogenated carbonate is 5 wt %. Further, in the Sample 31 in which the ratio of the halogenated carbonate is 60 wt % in the nonaqueous solvent components, the Sample 40 in which the ratio of the halogenated carbonate is 30 wt %, and the Samples 30 and 41 in which the ratio of the halogenated carbonate is 40 wt %, since the dielectric constants of the halogenated carbonates are low, the dielectric constant of the electrolyte solution is inconveniently lowered.

Accordingly, it is understood that the ratio of the halogenated carbonate is located within a range of 10 wt % or more and 20 wt % or less in the nonaqueous solvent components, so that the battery characteristics of the gel electrolyte battery 1 such as the large current discharging characteristics or the discharging characteristics under the low temperature can be improved without lowering the dielectric constant of the electrolyte solution.

According to the present invention, since the nonaqueous solvent having the ring structure in the nonaqueous electrolyte solution such as ethylene carbonate, propylene carbonate, γ-butyrolactone or the derivatives of them occupies 50 wt % or more in all the nonaqueous solvent components, the nonaqueous electrolyte solution has a sufficient dielectric constant. Further, according to the present invention, since at least one kind of halogenated carbonate expressed by the general formula (1) is included in the nonaqueous electrolyte solution, the battery characteristics such as the large current discharging characteristics or the discharging characteristics under the low temperature are improved.

In the present invention, since the above-described nonaqueous electrolyte solution is employed to use the halogenated carbonate whose decomposition is suppressed even under the repeated charging and discharging operations, an excellent nonaqueous electrolyte battery can be realized without generating such problems as the swelling of the battery or the deterioration of the cyclic characteristics. Specifically, can be realized the battery in which the rate of change of thickness is suppressed to a value lower than 20% even after the gel electrolyte battery is stored under a charged state at 100° C. for 3 hours.

What is claimed is:

1. A nonaqueous electrolyte having electrolyte salt dissolved in a nonaqueous solvent, wherein the ratio of the nonaqueous solvent having a ring structure is 50 wt % or more in nonaqueous solvent components and the nonaqueous solvent includes at least one or more kinds of halogenated solvents expressed by a below-described general formula (1);

(1)

(at least one of $R_1$ and $R_2$ designates an alkyl group having the number of carbons of 4 or larger and at least one of them is a halogenated alkyl group)
wherein the ratio of the halogenated solvent is 10 wt % or more and 20 wt % or less in the nonaqueous solvent components.

2. The nonaqueous electrolyte according to claim 1, wherein the nonaqueous solvent having the ring structure is composed of at least one member selected from the group consisting of ethylene carbonate, propylene carbonate, and γ-butyrolactone or derivatives thereof.

3. The nonaqueous electrolyte according to claim 1, wherein the nonaqueous electrolyte is gelled by a matrix polymer.

4. The nonaqueous electrolyte according to claim 3, wherein the matrix polymer is composed of at least one member which is selected from the group consisting of polyethers, halogen-containing polymer compounds, polymer compounds including as a main component any of methacrylic acid or various esters thereof, polyacrylamide, polycarbonate, polysulfone and polyether sulfone or derivatives, copolymers and mixtures thereof.

5. A nonaqueous electrolyte having electrolyte salt dissolved in a nonaqueous solvent, wherein the ratio of the nonaqueous solvent having a ring structure is 50 wt % or more in nonaguous solvent components and the nonaqueous solvent includes at least one or more kinds of halogenated solvents expressed by a below-described general formula (1);

(1)

(at least one of R1 and R2 designates an alkyl group having the number of carbons of 4 or larger and at least one of them is a halogenated alkyl group)
wherein the nonaqueous solvent having the ring structure is composed of at least one member selected from the group consisting of ethylene carbonate, propylene carbonate, and γ-butyrolactone or derivatives thereof and further wherein the nonaqueous electrolyte is gelled by a matrix polymer.

6. The nonaqueous electrolyte according to claim 2, wherein the matrix polymer is composed of at least one member which is selected from the group consisting of polyethers, halogen-containing polymer compounds, polymer compounds including as a main component any of methacrylic acid or various esters thereof, polyacrylamide, polycarbonate, polysulfone and polyether sulfone or derivatives, copolymers and mixtures thereof.

7. A nonaqueous electrolyte battery comprising: a cathode, an anode and a nonaqueous electrolyte, wherein the nonaqueous electrolyte has electrolyte salt dissolved in a nonaqueous solvent and the ratio of the nonaqueous solvent having a ring structure is 50 wt % or more in nonaqueous solvent components and the nonaqueous solvent includes at least one or more kinds of halogenated solvents expressed by a below-described general formula (1);

(1)

(at least one of $R_1$ and $R_2$ designates an alkyl group having the number of carbons of 4 or larger and at least one of them is a halogenated alkyl group)
wherein the ratio of the halogenated solvent is 10 wt % or more and 20 wt % or less in the nonaqueous solvent components.

8. The nonaqueous electrolyte battery according to claim 7, wherein the nonaqueous solvent having the ring structure is composed of at least one member selected from the group consisting of ethylene carbonate, propylene carbonate, and γ-butyrolactone or derivatives thereof.

9. The nonaqueous electrolyte battery according to claim 7, wherein the nonaqueous electrolyte is gelled by a matrix polymer.

10. The nonaqueous electrolyte battery according to claim 9, wherein the matrix polymer is composed of at least one member which is selected from the group consisting of polyethers, halogen-containing polymer compounds, polymer compounds including as a main component any of methacrylic acid or various esters thereof, polyacrylamide, polycarbonate, polysulfone and polyether sulfone or derivatives, copolymers and mixtures thereof.

11. A nonaqueous electrolyte battery comprising: a cathode, an anode and a nonaqueous electrolyte, wherein the nonaqueous electrolyte has electrolyte salt dissolved in a nonaqueous solvent and the ratio of the nonaqueous solvent having a ring structure is 50 wt % or more in nonaqueous solvent components and the nonaqueous solvent includes at least one or more kinds of halogenated solvents expressed by a below-described general formula (1);

(1)

(at least one of $R_1$ and $R_2$ designates an alkyl group having the number of carbons of 4 or larger and at least one of them is a halogenated alkyl group)
wherein the nonaqueous solvent having the ring structure is composed of at least one member selected from the group consisting of ethylene carbonate, propylene carbonate, and γ-butyrolactone or derivatives thereof and further wherein the nonaqueous electrolyte is gelled by a matrix polymer.

12. The nonaqueous electrolyte according to claim 11, wherein the matrix polymer is composed of at least one member which is selected from the group consisting of polyethers, halogen-containing polymer compounds, polymer compounds including as a main component any of methacrylic acid or various esters thereof, polyacrylamide, polycarbonate, polysulfone and polyether sulfone or derivatives, copolymers and mixtures thereof.

* * * * *